UNITED STATES PATENT OFFICE.

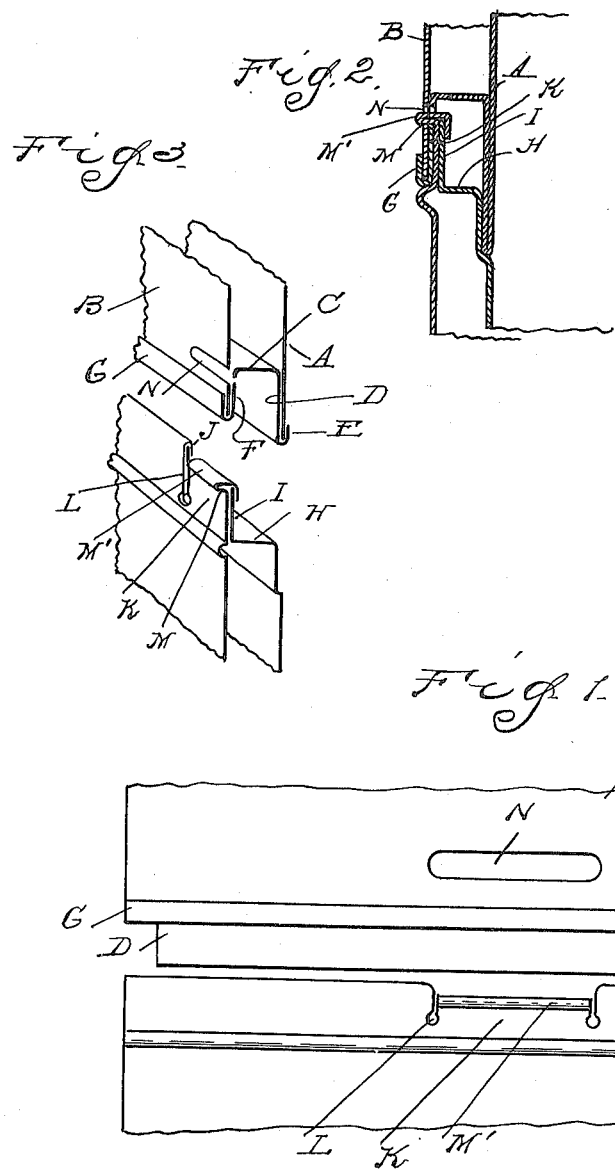

ISAAC STEARNS, OF DETROIT, MICHIGAN, ASSIGNOR TO MICHIGAN SAFETY FURNACE PIPE COMPANY, OF DETROIT, MICHIGAN, A CORPORATION OF MICHIGAN.

LOCKING DEVICE FOR SECTIONAL CONDUITS.

1,152,568.  Specification of Letters Patent.  Patented Sept. 7, 1915.

Application filed April 18, 1912. Serial No. 691,639.

*To all whom it may concern:*

Be it known that I, ISAAC STEARNS, a citizen of the United States of America, residing at Detroit, in the county of Wayne and State of Michigan, have invented certain new and useful Improvements in Locking Devices for Sectional Conduits, of which the following is a specification, reference being had therein to the accompanying drawings.

The invention relates to sectional conduits and more particularly to that type employed for hot air conductors for furnaces, and it is the object of the invention to provide means for locking the adjacent sections to each other.

To this end the invention consists in the construction as hereinafter set forth.

In the drawings,—Figure 1 is a side elevation of the ends of adjacent conduit sections in position for engagement with each other; Fig. 2 is a cross section showing said ends in engagement and locked; Fig. 3 is a sectional perspective view of the parts in the position shown in Fig. 1.

In the construction of sectional conduits employed for hot air conductors one type which has gone into extensive use is known as the safety pipe and is provided with spaced outer and inner walls. The joint between adjacent sections is formed by off-setting the ends of these outer and inner walls and oppositely at the two ends of the section so that when telescoped a double brake joint is formed. As shown, A is the inner wall of the section and B the spaced outer wall thereof. C is a spacer for separating the walls A and B which has a portion D parallel to the inner wall terminating in the return-bent flange E over the end of said wall, and a portion F parallel to the outer wall and return bent at G over the end thereof. At the opposite end of the section the spacer H is preferably formed integral with the inner wall and has the portion I parallel with the outer wall and connected thereto by the return bent flange J. Thus when the two ends of adjacent sections are engaged with each other a double brake telescopic joint will be formed.

To lock the sections when engaged from accidental disengagement I preferably provide a laterally bent tongue upon the one for engaging a registering slot or recess on the other. As shown, the flange I has a portion K thereof which is separated from the body portion by slits L. The outer end of this portion K is then bent outward at M and forms the locking tongue or hook M' which is engageable with a slot N in the flange F of the adjacent parallel outer wall of the section. Thus when the two inter-engageable ends of the adjacent sections are telescoped the tongue M' will first be sprung inward and then as it comes into registration with the slot N will be forced outward, forming a locking engagement. This will hold the sections from becoming detached, but at any time that it is necessary to detach them a slight pressure on the wall of the tongue section will disengage the hook from the slot and permit detachment.

What I claim as my invention is:

1. The combination of telescoping conduit sections each being provided with parallel outer and inner walls, and each having a spacer between said walls and having a portion lying adjacent to the outer wall to form a double ply flange, and the double-ply flange of one of the sections having a tongue formed out of a portion thereof, said tongue being separated from the remaining portion of said double-ply flange by slits and having its outer end laterally bent to form a hook, the other section being provided with a slot in the telescoping flange for engagement with said laterally bent hook.

2. The combination with telescopically engaging conduit sections having parallel inner and outer walls, of a spacer extending between the walls of each of said sections and provided with an outward extension parallel and adjacent to the outer wall to form a two-ply flange, the flange of one section having a tongue formed therefrom, said tongue being separated from the remaining portion of the last-mentioned flange by longitudinal slits and being laterally bent to form a hook, the telescoping flange of the adjacent section being slotted to form a keeper for engagement with said laterally bent hook.

In testimony whereof I affix my signature in presence of two witnesses.

ISAAC STEARNS.

Witnesses:
 JAMES P. BARRY,
 CHARLES B. BELKNAP.